United States Patent
Sato et al.

(10) Patent No.: US 11,202,328 B2
(45) Date of Patent: Dec. 14, 2021

(54) BASE STATION APPARATUS, TERMINAL APPARATUS, WIRELESS COMMUNICATION SYSTEM

(71) Applicants: SHARP KABUSHIKI KAISHA, Sakai (JP); FG Innovation Company Limited, Tuen Mun (HK)

(72) Inventors: Seiji Sato, Sakai (JP); Hideo Namba, Sakai (JP); Kozue Yokomakura, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 82 days.

(21) Appl. No.: 16/474,925

(22) PCT Filed: Dec. 28, 2017

(86) PCT No.: PCT/JP2017/047239
§ 371 (c)(1),
(2) Date: Jun. 28, 2019

(87) PCT Pub. No.: WO2018/128164
PCT Pub. Date: Jul. 12, 2018

(65) Prior Publication Data
US 2019/0342934 A1    Nov. 7, 2019

(30) Foreign Application Priority Data
Jan. 6, 2017  (JP) .............................. JP2017-001048

(51) Int. Cl.
*H04W 72/04* (2009.01)
*H04W 76/15* (2018.01)
*H04W 8/08* (2009.01)
*H04W 8/20* (2009.01)
*H04W 28/20* (2009.01)
(Continued)

(52) U.S. Cl.
CPC ............. *H04W 76/15* (2018.02); *H04W 8/08* (2013.01); *H04W 8/20* (2013.01); *H04W 28/20* (2013.01); *H04W 48/18* (2013.01); *H04W 92/10* (2013.01)

(58) Field of Classification Search
None
See application file for complete search history.

(56) References Cited

U.S. PATENT DOCUMENTS

| | | | | |
|---|---|---|---|---|
| 10,159,079 | B2 * | 12/2018 | Zhang | H04W 72/048 |
| 2013/0279521 | A1 * | 10/2013 | Perez Martinez | H04L 41/5029 370/468 |
| 2014/0274096 | A1 * | 9/2014 | Stanwood | H04W 40/38 455/452.1 |

OTHER PUBLICATIONS

Huawei, "Discussion on the solution of video optimization", R3-162867, 3GPP TSG-RAN3 Meeting #94, Rena, Nevada, USA, Nov. 14-18, 2016.

(Continued)

*Primary Examiner* — Willie J Daniel, Jr.
(74) *Attorney, Agent, or Firm* — ScienBiziP, P.C.

(57) ABSTRACT

Provided is a base station that is a base station apparatus connected to a terminal apparatus, the terminal apparatus being connected to a plurality of the base station apparatuses through physical link channels. In a case that a bandwidth assistant information request is received from the terminal apparatus, bandwidth assistant information for each of the physical link channels to which the terminal apparatus is connected is transmitted to the terminal apparatus.

12 Claims, 9 Drawing Sheets

(51) Int. Cl.
*H04W 48/18* (2009.01)
*H04W 92/10* (2009.01)

(56) References Cited

OTHER PUBLICATIONS

"Study on Small Cell enhancements for E-UTRA and E-UTRAN", 3GPP TR 36.842 V12.0.0 Dec. 2013.
Ericsson, "Solution proposal for DASH Optimisation", R3-163019, 3GPP TSG-RAN WG2 #94, Reno, Nevada, USA, Nov. 14-18, 2016.

* cited by examiner

BASE STATION APPARATUS, TERMINAL APPARATUS, WIRELESS COMMUNICATION SYSTEM

TECHNICAL FIELD

The present invention relates to a base station apparatus, a terminal apparatus, and a wireless communication system.

This application claims priority based on JP 2017-001048 filed on Jan. 6, 2017, the contents of which are incorporated herein by reference.

BACKGROUND ART

In recent years, the use of a wireless network system that includes at least a terminal apparatus and a base station apparatus, i.e., a cellular telephone network has been advanced and such a system is used in various applications. Such system or network is also used in applications that utilize information in wide bandwidth, such as video playback applications that have not been put into practical use without using a wired high-speed network.

A wireless network system differs from a wired network such that available bandwidth varies from time to time depending on a location of a terminal apparatus and surrounding environment. Furthermore, multiple terminals often share the same frequency channel, so that the available bandwidth may vary depending on the number of terminals accommodated by a base station apparatus.

CITATION LIST

Non Patent Literature

NPL 1: 3GPP, RAN3, R3-162867

SUMMARY OF INVENTION

Technical Problem

However, applications that use wide bandwidth, such as video playback applications, are susceptible to available bandwidth variations. For example, even in a case that the available bandwidth is determined as 1 Mbps and 800 Kbps video starts to be played, the available bandwidth may be 400 Kbps during video viewing in some cases. In such an environment where the available bandwidth is below a bit rate of the video, the video is not successfully played, and user experience of a user of a terminal apparatus is impaired.

One aspect of the present invention has been made in view of such circumstances, and an object of the present invention is to provide a measure for obtaining a bandwidth available in a wireless network system and following a change in a wireless environment, and to provide a comfortable video playback environment.

Solution to Problem (1) An aspect of the present invention has been made to solve the above-described problems, and a base station according to an aspect of the present invention is a base station apparatus connected to a terminal apparatus, the terminal apparatus being connected to a plurality of the base station apparatuses through physical link channels. In a case that a bandwidth assistant information request is received from the terminal apparatus, bandwidth assistant information for each of the physical link channels to which the terminal apparatus is connected is transmitted to the terminal apparatus.

(2) A base station apparatus according to an aspect of the present invention is the above-described base station apparatus, in which the bandwidth assistant information for each of the physical link channels includes charge prediction information for each of the physical link channels.

(3) A base station apparatus according to an aspect of the present invention is the above-described base station apparatus, in which the bandwidth assistant information for each of the physical link channels includes at least one of an upper limit of a bandwidth, a lower limit of the bandwidth, an average of the bandwidth, or a latency, the bandwidth being available for the terminal apparatus to receive a segment.

(4) A base station apparatus according to an aspect of the present invention is the above-described base station apparatus, in which in a case that a state of the base station apparatus is changed, the bandwidth assistant information for each of the physical link channels is transmitted to the terminal apparatus.

(5) A base station apparatus according to an aspect of the present invention is the above-described base station apparatus, in which the bandwidth assistant information is periodically transmitted to the terminal apparatus in accordance with a bandwidth assistant setup request from the terminal apparatus.

(6) A base station apparatus according to an aspect of the present invention is the above-described base station apparatus, in which a segment is transmitted to the terminal apparatus by using the physical link channel selected by the terminal apparatus in accordance with selection information of the physical link channel added to a segment request received from the terminal apparatus.

(7) A terminal apparatus according to an aspect of the present invention is a terminal apparatus connected to each of the multiple base station apparatuses through a physical link channel, the terminal apparatus receiving a bandwidth assistant information response for each of the physical link channels, and transmitting a segment request including selection information of the physical link channel and information speed selection information.

(8) A wireless communication system according to an aspect of the present invention is a wireless communication system including at least multiple base station apparatuses and a terminal apparatus, wherein the multiple base station apparatuses each connect to the terminal apparatus through a physical link channel, the multiple base station apparatuses each receive a bandwidth assistant information request from the terminal apparatus, the multiple base station apparatuses each transmit, to the terminal apparatus, a bandwidth assistant information response for each of the physical link channels to which the terminal apparatus is connected, and the terminal apparatus transmits, to the base station apparatus, a segment request including selection information of the physical link channel and information speed selection information.

(9) A wireless communication system according to an aspect of the present invention is the above-described wireless communication system, in which bandwidth assistant information for each of the physical link channels includes charge information for each of the physical link channels, based on contract information for each of the physical link channels.

(10) A wireless communication system according to an aspect of the present invention is the above-described wireless communication system, in which bandwidth assistant information for each of the physical link channels includes at least one of an upper limit of a bandwidth, a lower limit of the bandwidth, an average of the bandwidth, or a latency, the bandwidth being available for the terminal apparatus to receive a segment.

(11) A wireless communication system according to an aspect of the present invention is the above-described wireless communication system, in which in a case that states of the multiple base station apparatuses are changed, the multiple base station apparatuses each transmit, to the terminal apparatus, bandwidth assistant information for each of the physical link channels.

(12) A wireless communication system according to an aspect of the present invention is the above-described wireless communication system, in which the multiple base station apparatuses each periodically transmit bandwidth assistant information to the terminal apparatus in accordance with a bandwidth assistant setup request from the terminal apparatus.

(13) A wireless communication system according to an aspect of the present invention is the above-described wireless communication system, in which the multiple base station apparatuses each transmit a segment to the terminal apparatus by using the physical link channel selected by the terminal apparatus in accordance with selection information of the physical link channel added to a segment request received from the terminal apparatus.

Advantageous Effects of Invention

According to one aspect of the present invention, a measure for obtaining a bandwidth available in a wireless network system and tracking a change in a wireless environment can be provided to realize a comfortable video playback environment.

DESCRIPTION OF EMBODIMENTS

First Embodiment

Hereinafter, a first embodiment of the present invention will be described in detail with reference to the drawings.

Figure 2:
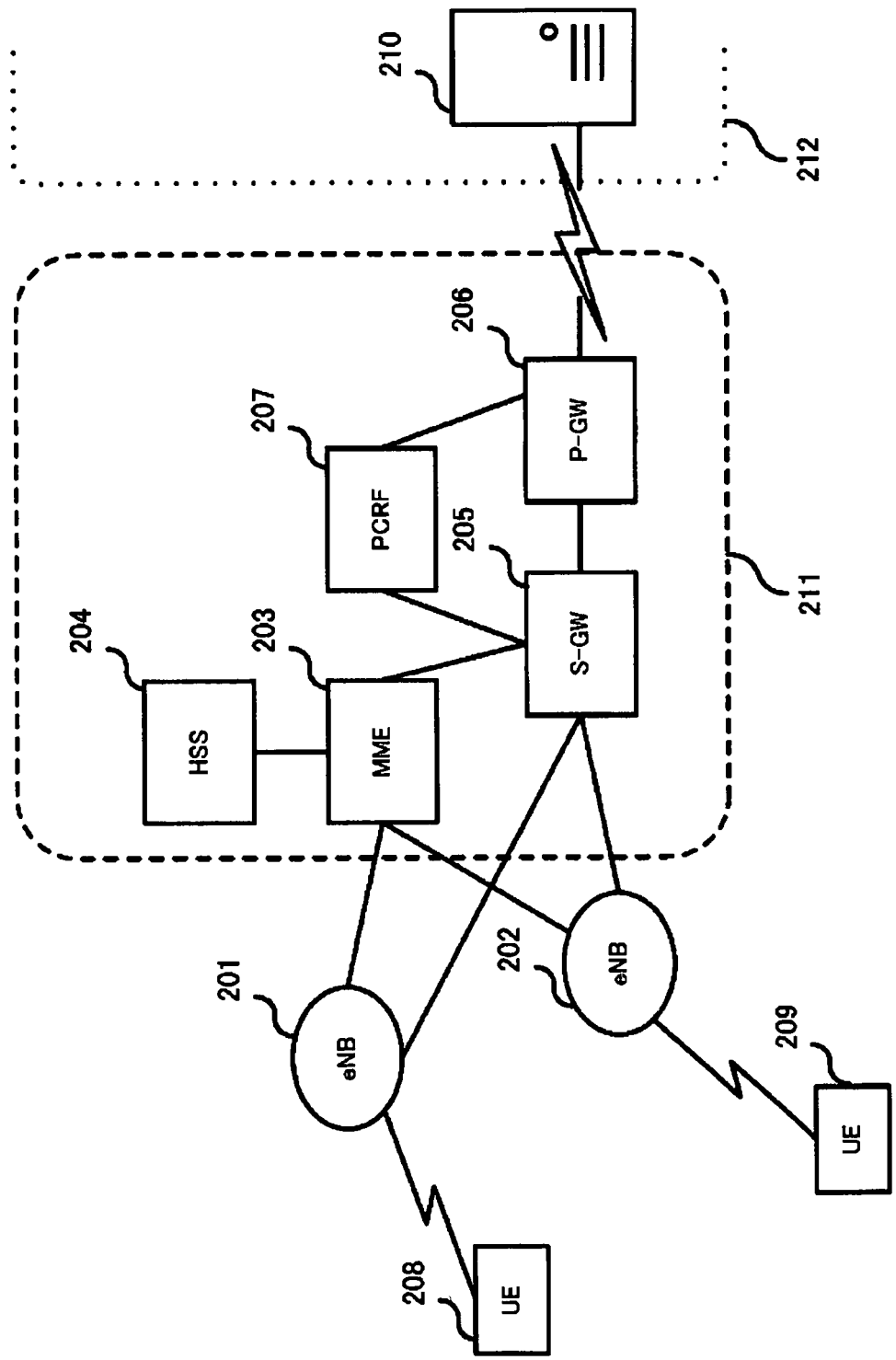
FIG. 2 is a diagram illustrating an example of a configuration of an embodiment of the present invention.

FIG. 2 is a diagram illustrating an overview of an example of a wireless communication system to which the present embodiment is applied. Each of base station apparatuses (eNB) 201 and 202 connects to one or more terminal apparatuses (UE) and further connects to a core network 211 including multiple apparatuses. The core network 211 includes various devices and includes at least a mobility management entity (MME) 203, a home subscriber server (HSS, subscriber management apparatus) 204, a serving gateway (S-GW) 205, a PDN gateway (P-GW) 206, a policy and charging rules function (PCRF) 207. The mobility management entity 203 is an apparatus providing a function of controlling a terminal apparatus to be connected to the base station apparatus 201 or 202, and a change of the base station apparatus to which the terminal apparatus is connected, and the like. The home subscriber server 204 is configured to, in response to inquiry from the mobility management entity 203, respond with a contract content of the terminal apparatus, depending on a terminal apparatus identifier included in the inquiry. The response includes information such as presence or absence of a contract of connection to the communication network, a type of contract, and the like. The serving gateway 205 is a gateway that controls a user data packet in the core network 211, and the user data refers to those other than dedicated control information for controlling each apparatus in the core network, a base station apparatus, and a terminal apparatus. The PDN gateway 206 is a gateway for connecting with an external packet switched network such as the Internet, and the policy and charging rules function 207 is an apparatus controlling the serving gateway 205 and the PDN gateway 206, and managing the charge management of the terminal apparatus, the bandwidth of the user data based on the terminal apparatus's contract information, and the like. The core network 211 is connected to the Internet 212 outside the core network 211, a content server 210 being connected to the Internet 212. Note that the content server 210 is also referred to as a media server, and stores video content and the like. There are two terminal apparatuses connected to the wireless network system, and one terminal apparatus 208 is connected to the base station apparatus 201, and the other terminal apparatus 209 is connected to the base station apparatus 202.

Figure 5:
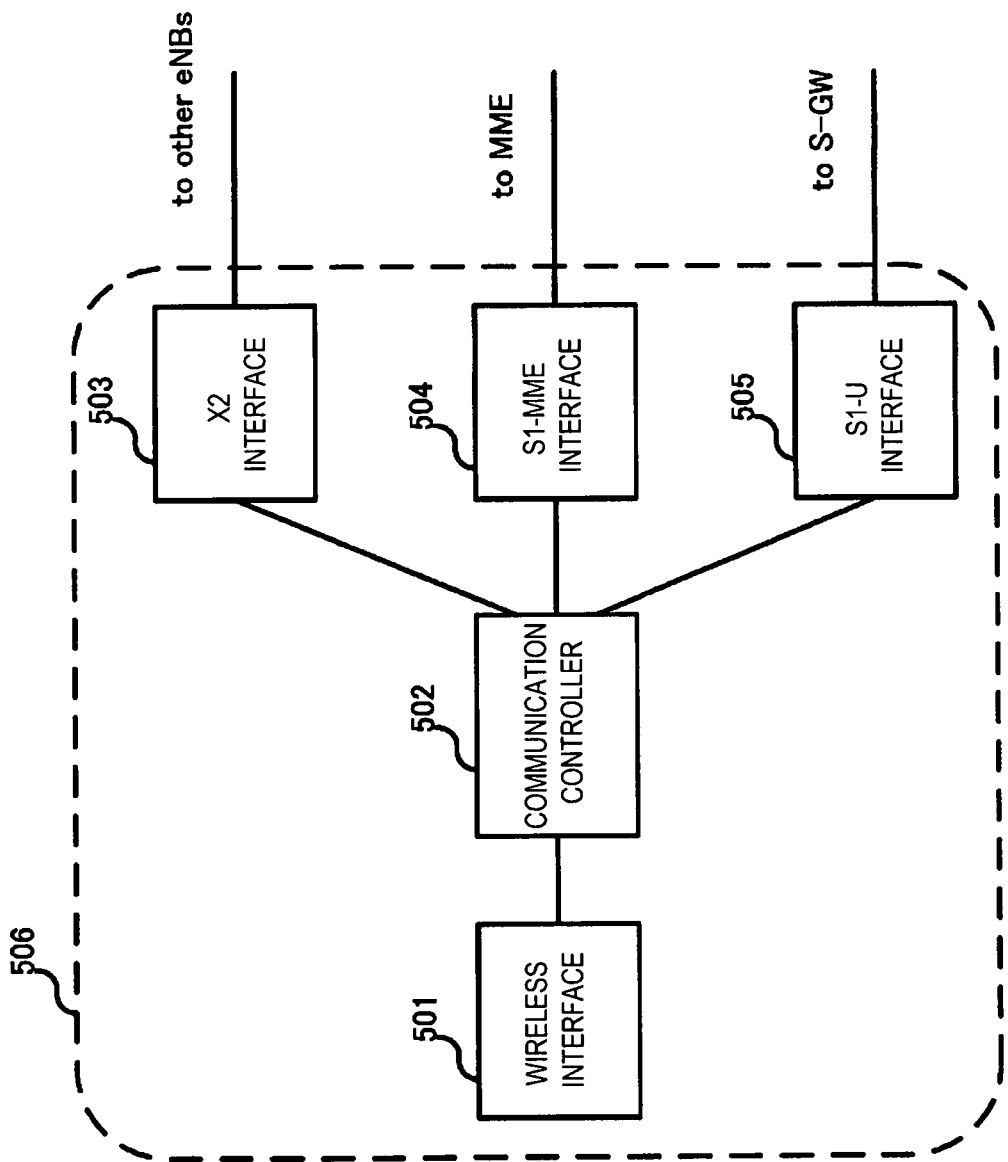
FIG. 5 is a block diagram illustrating an example of a configuration of a base station apparatus used in an embodiment of the present invention.

An example of a configuration overview of the base station apparatus 201 and the base station apparatus 202 will be described with reference to FIG. 5. In FIG. 5, blocks included in a region 506 are blocks included in the base station apparatus. A wireless interface unit 501 is a block which transmits and/or receives radio signals in accordance with a predetermined wireless frame format in control of the communication controller 502, and communicates with a terminal apparatus connected to the base station apparatus. 502 is a communication controller that controls the wireless interface unit 501, inputs, into the wireless interface, control data for a communication range that base station apparatus manages and transmission data for the terminal apparatus connected to the base station apparatus, and inputs, from the wireless interface unit 501, reception data transmitted from the terminal apparatus received at the wireless interface unit 501. The communication controller 502 uses an X2 interface unit 503 in a case of exchanging information with another base station apparatus in accordance with a predetermined procedure, uses an S-MME interface unit 504 in a case of exchanging information with the mobility management entity 203, and uses an S1-U interface unit 505 in a case of exchanging user data which the terminal apparatus communicates. The communication controller 502 performs message exchange via the wireless interface unit 501 in a case of exchanging messages with the terminal apparatus, via the X2 interface unit 503 in a case of exchanging messages with another base station apparatus, or via the S-MME interface 504 in a case of exchanging messages with the mobility management entity 203. 503 is an X2 interface unit to communicate with another base station apparatus, 504 is an S1-MME interface unit to communicate with the mobility management entity 203, and 505 is an S1-U interface unit to communicate with the serving gateway 205.

Figure 6:
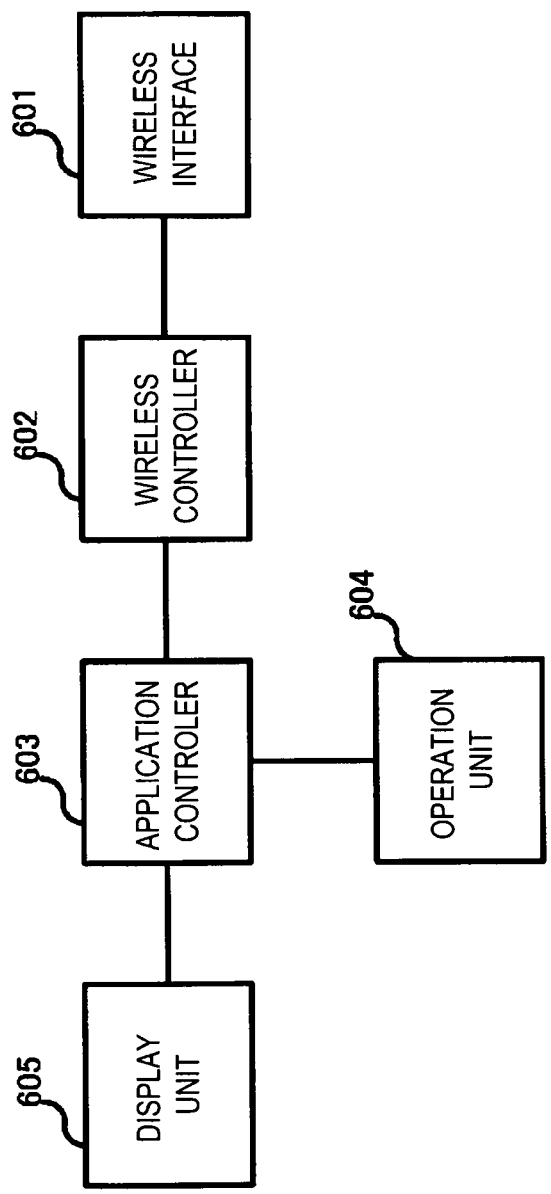
FIG. 6 is a block diagram illustrating an example of a configuration of a terminal apparatus used in an embodiment of the present invention.

Next, an example of a configuration overview of the terminal apparatus 208 and the terminal apparatus 209 will be described with reference to FIG. 6. 601 is a wireless interface unit to receive radio signals transmitted from the base station apparatus and transmit radio signals to the base station apparatus, based on control of a wireless controller 602. 602 is a wireless controller to transmit and/or receive control data and user data for the base station apparatus, by controlling the wireless interface unit 601 in accordance with a predetermined procedure. 603 is an application controller to operate an operating system (OS) and perform various applications on the OS. 604 is an operation unit to input operations of the user of the terminal apparatus in a case of performing applications where the application controller 603 operates interactively. 605 is a display unit to display images by applications performed by the application controller 603. The application controller 603 and the wireless controller 602 are connected to each other, and in a case of performing communication via an application wireless network, communicate control data and user data of the wireless network for the base station layer by the control of the OS. In a case of performing a video streaming application, an application program for video streaming is loaded into a storage apparatus of the OS application controller 603 and performed. At this time, the display unit may be controlled through control of the application, and video or an image for the user to facilitate operation may be displayed. Data used by the application is used as user data in communication, and data used by the wireless network is used as control data in communication. The OS may receive an indication to control the wireless network from the application via the application program interface (API) and communicate control data to control the wireless network by controlling the wireless controller.

Figure 4:
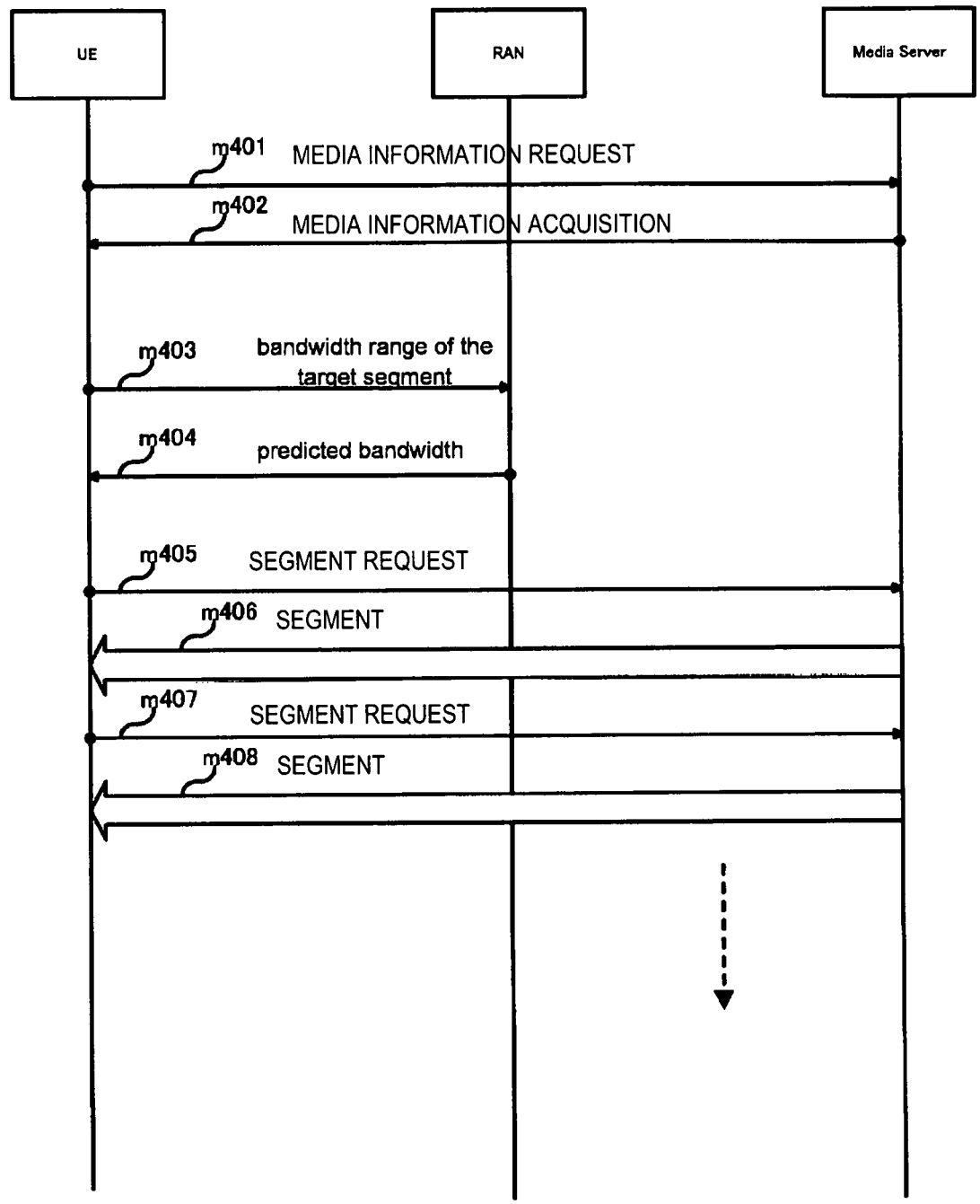
FIG. 4 is a message flow diagram illustrating an example of a conventional protocol.

An overview of an example of a conventional video delivery streaming protocol is described with reference to FIG. 4. While there are several protocols for streaming, the present embodiment uses a protocol of a type that divides the video content stored in a content delivery server into multiple segments and transmits each segment in accordance with a request from the client. For these segments, parameters such as several resolutions, information speeds (also referred to as coding speeds, bit rates) can be specified by the client, such that a file containing information of these contents and information of segments can be read into the client beforehand, and parameters such as resolutions, information speeds, or the like can be specified in a case of requesting each segment from the client. As an example, such files are referred to as a Playlist in the HTTP Live Streaming (HLS) protocol, a Media Presentaion Description (MPD) file in the MPEG DASH protocol, or the like. Such files and information are referred to as media information below. Note that a server that transmits the segments and a server that stores the media information may be the same server or different servers from each other, and the server that transmits the segments may be identified from the description of the media information.

A terminal apparatus operating as a client transmits a message m401 to a media server via a wireless network (Redio Access Network (RAN)) to request the media server to transmit media information of the desired contents. The media server transmits the requested media information to the terminal apparatus that is a client via the wireless network. The terminal apparatus having received the media information transmits a message m405 to the media server to request transmission of a segment. The media server requested to transmit the segment transmits a segment m406 to the terminal apparatus, which is the requesting client. The terminal apparatus transmits a message m407 requesting a next segment to the media server during playback of the received segment m406. The media server having received the message m407 transmits the requested segment to the terminal apparatus that has transmitted the message m407. In the following, streaming is continued by alternating the transmissions of a message requesting a segment and the segment. In a case of requesting a segment, the terminal apparatus that is a client may consider a bandwidth that can be used for communication. As a method for considering the bandwidth available in the wireless network, NPL 1 discloses a method to notify any device in the wireless network of candidates of information speed available for a segment that a terminal apparatus requests as a message m403, and receive an information speed predicted as available as a message m404 from any device in the wireless network.

However, how to perform bandwidth prediction is not described in the technology described in NPL 1. In the present embodiment, a method for notifying a terminal apparatus of specific available bandwidth as bandwidth assistant information will be described with reference to FIG. 1.

Figure 1:
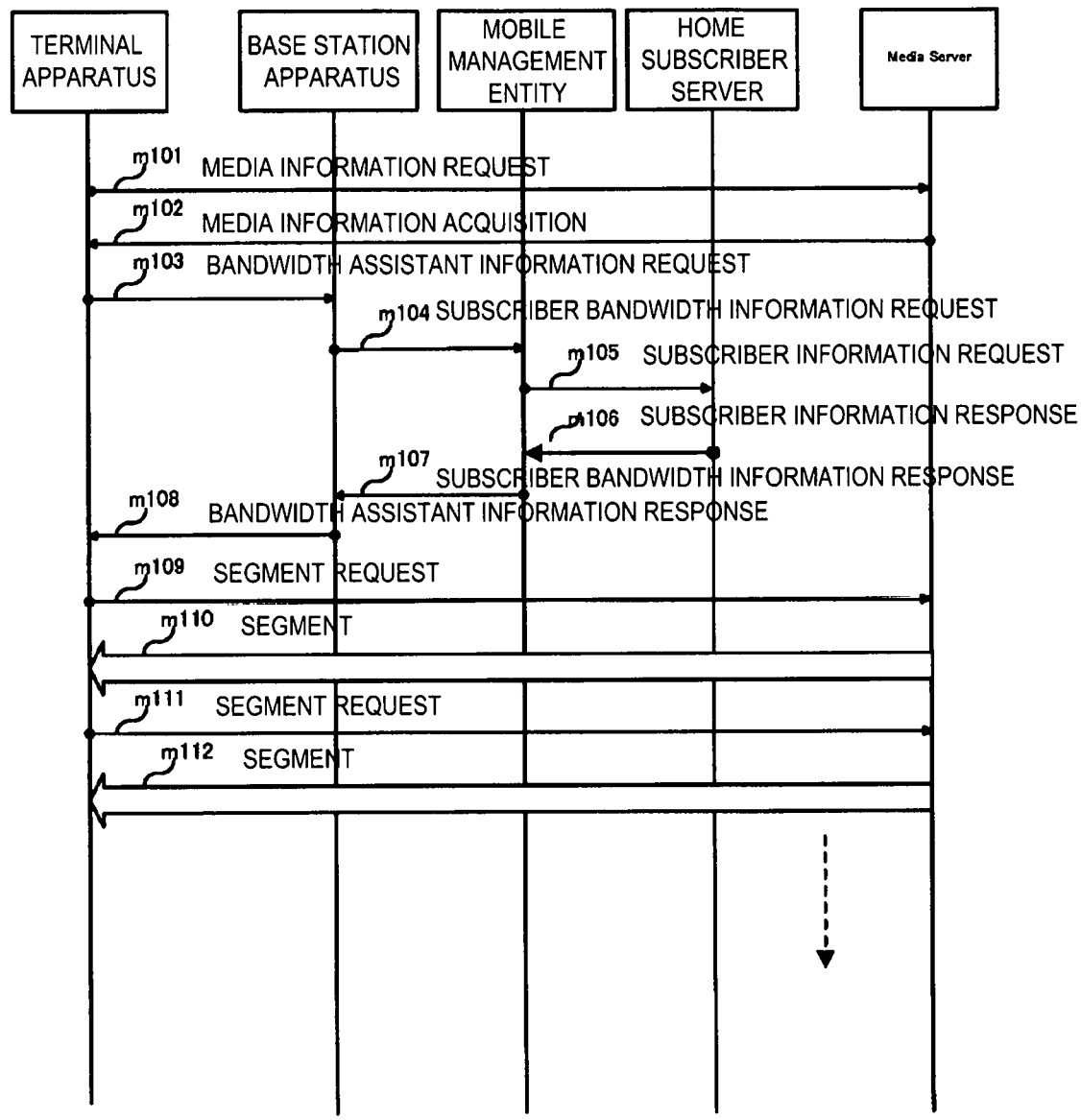
FIG. 1 is a diagram illustrating an example of message exchange used in an embodiment of the present invention.

In the following description, an example in which the terminal apparatus 208 illustrated in FIG. 2 connects to the base station apparatus 201 and requests streaming transmission for the media server 210 on the Internet 212 via the core network 211 will be described. FIG. 1 illustrates a message flow illustrating an example of message exchange used in an embodiment of the present invention. The terminal apparatus 208 transmits a message m101 to the media server 210 via the base station apparatus 201 to request media information of the contents for the media server. Here, the media information is information related parameters for managing video content, and may include a resolution of the video content, an information speed (also referred to as a coding speed), and the like. The media information request m101 is a message of the terminal apparatus 208 requesting media information from the media server 210. The media server 210 transmits a message m102 to the terminal apparatus 208 via the core network 211 and the base station apparatus 201, and transmits the requested media information to the terminal apparatus 208. The terminal apparatus 208 that has received the media information examines candidates for information speed (also referred to as bit rate) that can be used in requesting transmission of a segment for the media server, from the information included in the media information, and uses some or all of the candidates to transmit a message m103 to the base station apparatus 201 to request the bandwidth assistant information. This message transmission operation may be initiated by a media viewing application operating in the application controller 603 illustrated in FIG. 6 controlling the wireless controller 602 by using OS API operating in the application controller 603, or may be initiated by the OS operating in the application controller 603 monitoring the operation of the media viewing application and automatically operating the wireless controller 602 in a case of having detected that the media viewing application has received media information such as the message m102. The following message exchange is performed by the wireless controller 602, but the OS or the application operating in the application controller 603 may perform part of the message exchange processing. Here, the terminal apparatus 208 includes information related to information speed in the message m103. This information related to information speed may use candidates for information speed included in the media information received from the base station apparatus 201, or the terminal apparatus 208 may select and use some information speeds among the candidates for information speed included in the media information. For example, the terminal apparatus 208 may exclude high-speed information speed at which the terminal apparatus 208 is not able to process, or exclude low-speed information speed at which the user experience is diminished, or may select in consideration of image processing performance, display screen size, and the like that the terminal apparatus has, from the candidates for information speed included in the media information. The terminal apparatus 208 may configure information speed selection criteria beforehand, or may configure at each time to transmit a bandwidth assistant information request such as the message m103. The base station apparatus 201 that has received the message m103 transmits a message m104 to the mobility management entity 203 to request information related to the bandwidth that the terminal apparatus is subscribed (hereinafter referred to as subscriber bandwidth information). In a case of transmitting the message m104, the base station apparatus 201 may request the mobility management entity 203 for subscriber bandwidth information of multiple terminal apparatuses. As one example, in addition to the terminal apparatus 208 that has transmitted the message m103, subscriber bandwidth information for terminal apparatuses currently connected to the base station apparatus 201 may be requested. At this time, the base station apparatus 201 may examine the capability of the terminal apparatuses connected to the base station apparatus 201, and may request subscriber bandwidth information by excluding terminal apparatuses that cannot communicate at an information speed equal to or greater than a prescribed value. In a case that the capability of the terminal apparatus 208 is not capable of communicating at an information speed equal to or greater than a prescribed value, the prescribed value may be used as subscriber bandwidth information for the terminal apparatus 208, and may be used to generate the bandwidth assistant information described later, without performing subscriber bandwidth information request to the mobility management entity 203. In a case that there is information of the terminal apparatus acquired from the mobility management entity 203 within a prescribed time, the request for information regarding the terminal apparatus may be stopped.

The mobility management entity 203 having received the message m104 transmits a message m105 to the home subscriber server 204 to request subscriber information for the terminal apparatus specified in the message m104. At this time, it is not necessary to request all of the subscriber information of the terminal apparatus, and only information related to the prediction of the bandwidth may be requested. For example, some or all of call control information (barring information) of the terminal apparatus, access restriction information, charge contract information, contracted QoS (service quality) profile information, total bandwidth information of contracted bearers, charge information contracted for a packet data network, and the like, may be requested. Information related to different bandwidth may be requested for each terminal. In a case that information obtained by querying the home subscriber server 204 within a predetermined amount of time is present in the mobility management entity 203, information may not be queried for the terminal apparatus corresponding to that information.

The home subscriber server 204 that has received the message m105 transmits, to the mobility management entity 203, a message m106 as a response to the message m105, including information related to the terminal apparatus requested with the subscriber information included in the message m105. The home subscriber server 204 may include all the information requested in the message m106 or may transmit only a part of the requested information. As an example, information with no contract may be notified of the absence of a contract, or the presence or absence of information may not be notified. The message m106 may not include information determined to be problematic for notifying in view of security management of the network.

The mobility management entity 203 having received the message m106 utilizes the information included in the message m106 to generate a response message m107 for the request for subscriber bandwidth information for the message m104, and transmits the generated message to the base station apparatus 201 which has transmitted the message m104. The message m107 may include all of the contents requested in the message m104, or in a case that the information not requested by the message m105 is present in the mobility management entity 203, may include the information not requested. In addition, the message m107 may not include all the information requested in the message m104, and may not include information that is not included in the message m106 transmitted from the home subscriber server 204, or information determined to be problematic for notifying in view of security management of the network. For example, the subscriber information response in the message m107 includes subscriber bandwidth information for the terminal apparatus 208, and includes information on the bandwidth used by the terminal apparatus 208.

The base station apparatus 201 that has received the message m107 predicts bandwidth available by the terminal apparatus 208, based on information related to information speed included in the message m103 and the subscriber bandwidth information included in the message m107, generates a message m108 including the bandwidth information, and transmits the message m108 which is the bandwidth assistant information to the terminal apparatus 208 as a response to the message m103. The bandwidth assistant information is information on candidates of information speed that can be specified or a range of information speed that can be specified in a case that the terminal apparatus 208 thereafter requests transmission of segments for the media server 210. The base station apparatus 201 selects information to be included in the bandwidth assistant information from candidates of information speed included in the message m103. For example, in a case that the information speeds included in the media information are 800 Kbps, 1 Mbps, and 2 Mbps and the communication speed of the terminal apparatus 208 indicated by the subscriber bandwidth information of the terminal apparatus 208 is at most 1 Mbps, the base station apparatus 201 may configure the information speed included in the bandwidth assistant information to be any of 800 Kbps and 1 Mbps, or 1 Mbps only. In a case that information other than the subscriber bandwidth information of the terminal apparatus 208 is to be taken into account, for example, in case that there are many terminal apparatus connected to the base station apparatus 201, only 800 kbps that is less than or equal to the value indicated by the subscriber bandwidth information may be configured. In calculating the information speed included in the bandwidth assistant information, the base station apparatus 201 may measure the average communication speed of other terminal apparatuses connected to the base station apparatus 201, and determine the available bandwidth, based on the speed subtracting the average communication speed from the communication speed in a case of utilizing the total bandwidth available by the base station apparatus 201. In a case that the base station apparatus manages the transmission signal in wireless resource units divided in the frequency direction and the time direction, the available bandwidth may be determined based on the number of wireless resources that are unused for transmission for each terminal apparatus. In a case that a contract to guarantee communication bandwidth is included in the contract information of the terminal apparatus that has transmitted the message m103, the available bandwidth may be determined based on the compensated communication bandwidth. In a case that a contract to guarantee communication bandwidth is included in the contract information of other terminal apparatuses connected to the base station apparatus 201, the available bandwidth may be determined while separately guaranteeing the guaranteed bandwidth. In a case that a contract to guarantee latency is included in the contract information of other terminal apparatuses connected to the base station apparatus 201, the available bandwidth may be determined while guaranteeing the bandwidth necessary for the latency guarantee. This latency guarantee may guarantee latency in which communication can be reliably performed, or may guarantee the time to reach of the initial feed even in a case that the arrival is uncertain. In a case that a terminal apparatus not including a communication bandwidth guarantee contract is included in other terminal apparatuses connected to the base station apparatus 201, the available bandwidth may be determined assuming that the terminal apparatus turns down the currently used communication bandwidth. In addition to the information included in the message m107, the available bandwidth may be determined using other information in the base station apparatus 201. There may be one or multiple information speeds included in the message m108 as the available bandwidth. In a case that multiple information speeds are included, information related to the upper and lower limits of the available bandwidth may be included.

The terminal apparatus 208 that has received the message m108 transmits a message m109 and a message m111 that request the transmission of a segment to the media server 210, using the bandwidth assistant information (information speed notified as the available bandwidth) transmitted in the message m108 as follows. The media server 210 transmits the segment in a message m110 and a message m112 to the terminal apparatus, by using the information speed included in the message m109 and the message mill. In a case that multiple information speeds are included in the message m108, the terminal apparatus 208 may transmit the message m109 and the message m111, by using any of the multiple information speeds. For example, the message m109 and the message m111 may be transmitted by specifying a small information speed in a case that an amount of information accumulated in a receiving buffer of the terminal apparatus 208 is large, or by specifying a large information speed in a case that information accumulated in the receiving buffer is small. Furthermore, in a case that the upper limit and the lower limit of the available bandwidth are specified in the message m108, the information speed may be specified in the range of the upper limit and the lower limit.

Each apparatus operates as described above, and thus the terminal apparatus 208 can use information indicating the available bandwidth expected based on the contract information of the terminal apparatus connected to the base station apparatus 201, and by requesting transmission of a segment for the media server 210, the terminal apparatus 208 can specify an appropriate information speed and request transmission of the segment for the media server, and can improve the experience of the user using the terminal apparatus 208. In the present embodiment, the communication controller 502 in FIG. 5 performs control of the messages transmitted and/or received by the base station apparatus 201.

Second Embodiment

Figure 3:
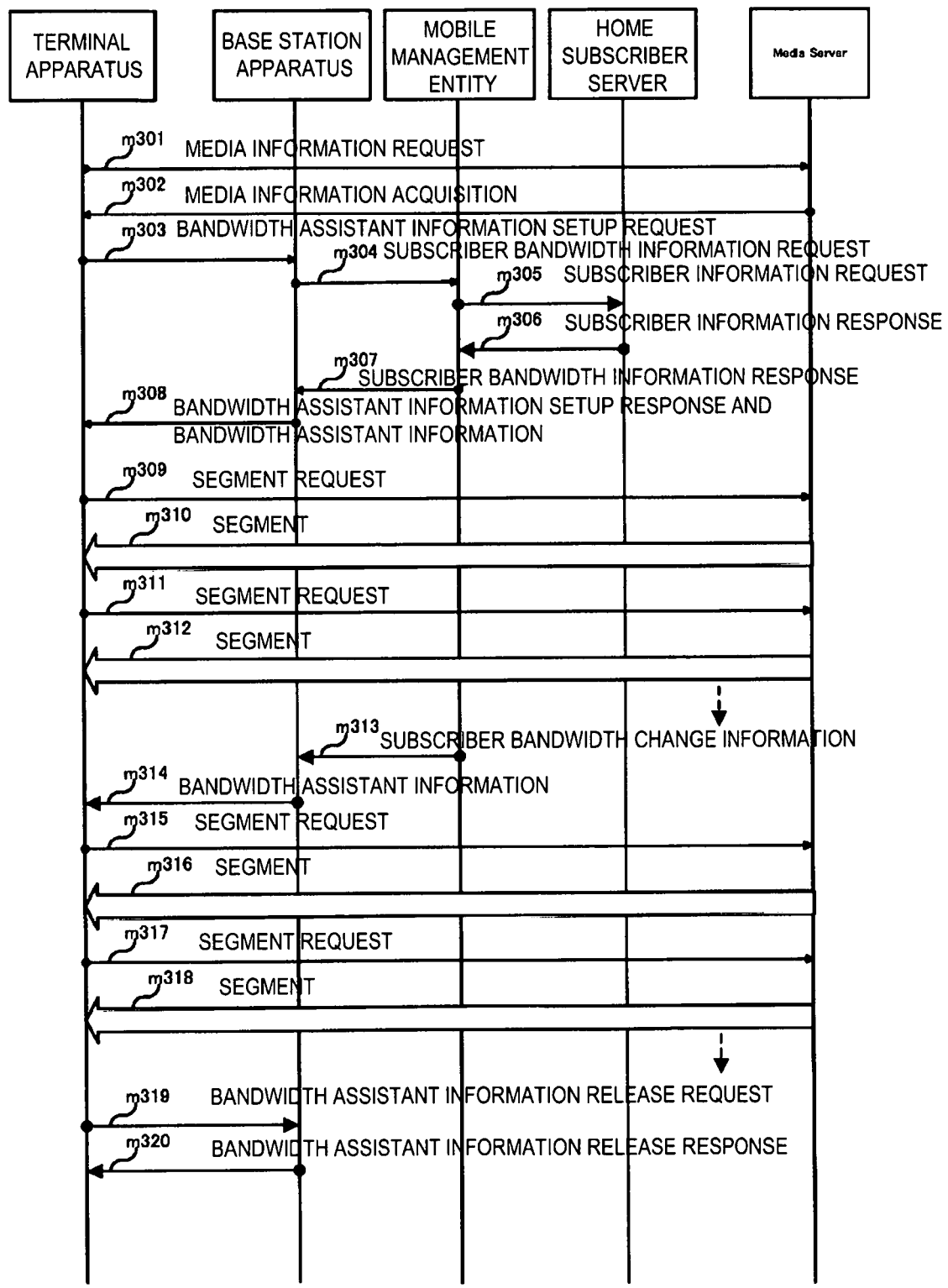
FIG. 3 is a diagram illustrating an example of message exchange used in an embodiment of the present invention.

In a second embodiment, an example of a method for transmitting, at each occurrence, bandwidth assistant information transmitted by a base station apparatus to a terminal apparatus in accordance with a status of the base station will be described. The configuration of the wireless network is the same as that of FIG. 2. The configuration of the base station apparatus is the same as that of FIG. 5, and the configuration of the terminal apparatus is the same as that of FIG. 6. An example of a message flow for processing of the present embodiment is illustrated in FIG. 3. As an example of a case in which the status of the base station changes, a case where the terminal apparatus 209 connected to the base station apparatus 202 moves during the process flow of the bandwidth assistant information and the connection destination changes to the base station apparatus 201 will be described below using FIG. 3.

The terminal apparatus 208 transmits a message m301 to the media server 210 via the base station apparatus 201 to request media information of the contents for the media server. The media server 210 transmits a message m302 to the terminal apparatus 208 via the core network 211 and the base station apparatus 201, and transmits the requested media information to the terminal apparatus 211. The terminal apparatus 208 that has received the media information examines candidates for information speed (also referred to as coding speed, bit rate) that can be used in requesting transmission of a segment for the media server, from the information included in the media information, and uses some or all of the candidates to transmit a message m303 to the base station apparatus 201 to request configuration (setup) of transmission of bandwidth assistant information. This message transmission operation may be initiated by a media viewing application operating in the application controller 603 illustrated in FIG. 6 controlling the wireless controller 602 by using OS API operating in the application controller 603, or may be initiated by the OS operating in the application controller 603 monitoring the operation of the media viewing application and automatically operating the wireless controller 602 in a case of having detected that the media viewing application has received media information such as the message m302. The following message exchange is performed by the wireless controller 602, but the OS or the application operating in the application controller 603 may perform part of the message exchange processing. The base station apparatus 201 having received the message m303 transmits the bandwidth assistant information to the terminal apparatus 208 each time the state of the base station apparatus changes as described below, until receiving a message to release the configuration of the bandwidth assistant information, or until the terminal apparatus that has transmitted the message m303 is disconnected from the network. Although FIG. 3 illustrates a case in which the bandwidth assistant information is transmitted in a case that the state of the base station apparatus is changed, the bandwidth assistant information may be transmitted periodically from the base station apparatus to the terminal apparatus regardless of the state change of the base station apparatus. The terminal apparatus 208 may select the information speed to be included in the message m303, and as an example, the terminal apparatus 208 may exclude high-speed information speeds at which the terminal apparatus 208 cannot process, or exclude low-speed information speeds at which the user experience is diminished. The terminal apparatus 208 may configure information speed selection criterion beforehand. The base station apparatus 201 that has received the message m303 transmits a message m304 to the mobility management entity 203 to request information related to the bandwidth that the terminal apparatus is subscribed (hereinafter referred to as subscriber bandwidth information). In a case of transmitting the message m304, the mobility management entity 203 may be requested with subscriber bandwidth information of multiple terminal apparatuses. As one example, in addition to the terminal apparatus that has transmitted the message m303, subscriber bandwidth information of terminal apparatuses currently connected to the base station apparatus 201 may be requested. At this time, the capability of the terminal apparatuses connected to the base station apparatus 201 may be examined, and subscriber bandwidth information may be requested excluding terminal apparatuses that cannot communicate at an information speed equal to or greater than a prescribed value. In a case that the capability of the terminal apparatus 208 is not capable of communicating at an information speed equal to or greater than a prescribed value, the prescribed value may be used as subscriber bandwidth information for the terminal apparatus 208, and may be used to generate the bandwidth assistant information described later, without performing subscriber bandwidth information request to the mobility management entity 203. In a case that there is information of the terminal apparatus acquired from the mobility management entity 203 within a prescribed time, the request for information regarding the terminal apparatus may be stopped. Furthermore, as information of a terminal for which the base station apparatus after the change of the connection destination may be the base station apparatus 201 due to the change of the connection destination base station apparatus by the move of the terminal apparatus, subscriber bandwidth information for the terminal apparatuses connected to an adjacent base station apparatus, specifically the base station apparatus 202 in the present embodiment, may be requested.

The mobility management entity 203 having received the message m304 transmits a message m305 to the home subscriber server 204 to request subscriber information for the terminal apparatus specified in the message m304. At this time, it is not necessary to request all of the subscriber information of the terminal apparatus, and only information related to the prediction of the bandwidth may be requested. For example, some or all of call control information (barring information) of the terminal apparatus, access restriction information, charge contract information, contracted Quality of Service (QoS) profile information, total bandwidth information of contracted bearers, charge information contracted for a packet data network, and the like, may be requested. Information related to different bandwidth may be requested for each terminal. In a case that information obtained by querying the home subscriber server 204 within a predetermined amount of time is present in the mobility management entity 203, information may not be queried for the terminal apparatus corresponding to that information.

The home subscriber server 204 that has received the message m305 transmits, to the mobility management entity 203, a message m306 as a response to the message m305, including information regarding the terminal requested with the subscriber information included in the message m305. The home subscriber server 204 may include all the information requested in the message m306 or may transmit only a part of the requested information. As an example, information with no contract may be notified of the absence of a contract, or the presence or absence of information may not be notified. The message m306 may not include information determined to be problematic for notifying in view of security management of the network.

The mobility management entity 203 having received the message m306 utilizes the information included in the message m306 to generate a response message m307 for the request for subscriber bandwidth information for the message m304, and transmits the generated message to the base station apparatus 201 which has transmitted the message m304. The message m307 may include all of the contents requested in the message m304, or in a case that the information not requested by the message m305 is present in the mobility management entity 203, may include the information not requested. In addition, the message m307 may not include all the information requested in the message m304, and may not include information that is not included in the message m306 transmitted from the home subscriber server 204, or information determined to be problematic for notifying in view of security management of the network.

The base station apparatus 201 that has received the message m307 predicts bandwidth available by the terminal apparatus 208, based on the information included in the message m303 and the information included in the message m307, generates a message m308 including the bandwidth information, and transmits the message m308 which is bandwidth assistant information to the terminal apparatus 208 as a response to the message m303. This available bandwidth is selected from candidates of information speed that can be specified in a case that the terminal apparatus 208 thereafter requests transmission of a segment for the media server 210, i.e., information speed included in the message m303. In calculating the information speed, the average communication speed of other terminal apparatuses connected to the base station apparatus 201 may be measured, and the available bandwidth may be determined based on the speed obtained by subtracting the average communication speed from the communication speed in a case of utilizing the total bandwidth available by the base station apparatus 201. In a case that the base station apparatus manages the transmission signal in wireless resource units divided in the frequency direction and the time direction, the available bandwidth may be determined based on the number of wireless resources that are unused for transmission for each terminal. In a case that a contract to guarantee communication bandwidth is included in the contract information of the terminal apparatus that has transmitted the message m303, the available bandwidth that can be used may be determined based on the guaranteed communication bandwidth. In a case that a contract to guarantee latency is included in the contract information of other terminal apparatuses connected to the base station apparatus 201, the available bandwidth may be determined while guaranteeing the bandwidth necessary for the latency guarantee. This latency guarantee may guarantee latency in which communication can be reliably performed, or may guarantee the time to reach of the initial feed even in a case that the arrival is uncertain. In a case that a contract to guarantee communication bandwidth is included in the contract information of other terminal apparatuses connected to the base station apparatus 201, the available bandwidth that can be used may be determined while separately guaranteeing the compensated bandwidth. In a case that a terminal apparatus not including a communication bandwidth guarantee contract is included in other terminal apparatuses connected to the base station apparatus 201, the available bandwidth may be determined assuming that the terminal apparatus turns down the currently used communication bandwidth. In addition to the information included in the message m307, the available bandwidth may be determined using other information in the base station apparatus 201. There may be one or multiple information speeds included in the message m308 as the available bandwidth. Information speed may be selected using the method described in the first embodiment. In a case that multiple information speeds are included, information related to the upper and lower limits of the available bandwidth may be included. In the handover process associated with the movement of the terminal apparatus, the available bandwidth may be determined depending on the contract information of the terminal apparatus, for which the connection destination may become the base station apparatus 208. For example, in a case that there is a terminal apparatus that is connected to an adjacent base station apparatus and a contract guaranteeing bandwidth, the available bandwidth may be estimated to be small.

The terminal apparatus 208 that has received the message m308 transmits a message m309 and a message m311 that request the transmission of a segment to the media server 210, using the bandwidth assistant information (information speed notified as the available bandwidth) transmitted in the message m308 as follows. The media server 210 transmits the segment in a message m310 and a message m312 to the terminal apparatus, using the information speed included in the message m309 and the message m311. In a case that multiple information speeds are included in the message m308, the terminal apparatus 208 may transmit the message m309 and the message m311, using any of the multiple information speeds. For example, the message m309 and the message m311 may be transmitted by specifying a small information speed in a case that an amount of information accumulated in a receiving buffer of the terminal apparatus 208 is large, or by specifying a large information speed in a case that information accumulated in the receiving buffer is small. Furthermore, in a case that the upper limit and the lower limit of the bandwidth available are specified in the message m308 the information speed may be specified in the range of the upper limit and the lower limit.

The terminal apparatus 209 connected to the base station apparatus 202 moves at the same time or around the time when receiving the message m312, and a handover process is performed to change the connection destination to the base station apparatus 201. As this handover process is performed, subscriber bandwidth change information including the subscriber bandwidth information for the terminal apparatus 209 newly added to the base station apparatus 201 is transmitted as a message m313 (subscriber bandwidth change information) from the mobility management entity 203. Here, the subscriber bandwidth information is transmitted as a separate message, but in a case that the subscriber bandwidth information or information corresponding to the subscriber bandwidth information may be included in a connection configuration message such as a message used in a handover process, for example, an RRC connection reconfiguration message, for example, a case that the message m307 includes information of terminal apparatus of an adjacent base station, or the like, information associated with the information, e.g., an identifier that can identify a terminal may be included in a connection configuration message. Here a case where the transmission trigger of m313 is a handover of the terminal apparatus 209 is indicated, but also in a case that a terminal connected to the base station apparatus 201 changes, for example, in a case that another terminal apparatus makes an initial connection to the base station apparatus 201 and registration with the mobility management entity 203 has ended, the mobility management entity 203 may transmit subscriber bandwidth change information to the base station apparatus 201.

The base station apparatus 201 that has received the new subscriber bandwidth information calculates available bandwidth in consideration of the subscriber bandwidth information, and transmits a message m314 including new bandwidth assistant information to the terminal apparatus having received the bandwidth assistant information setup request, for example, the terminal apparatus 201 in FIG. 3. The terminal apparatus 208 that has received the message m314 specifies information speed specified in a message m315 and a message m317 requesting transmission of following segments, based on the bandwidth assistant information included in the message m314. The method of specifying at this time may be similar to the method used in the message m309 and the message m311.

In a case that viewing of the streaming data is terminated, the terminal apparatus 208 transmits, to the base station apparatus 201, a message m319 including bandwidth assistant information release request to release the configuration of the bandwidth assistant information. The base station apparatus 201 that has received the message m319 cancels transmission of the following bandwidth assistant information (release of the configuration) to the terminal apparatus 208, and transmits a message m320 including a bandwidth assistant information release response. In a case that the wireless link between the base station apparatus 201 and the terminal apparatus 208 is disconnected, the configuration of the bandwidth assistant information may be released. In a case of a handover in which the connection destination of the terminal apparatus 208 is changed from the base station apparatus 201 to the base station apparatus 202, the configuration of the bandwidth assistant information may be released. Further, during this handover, information related to the configuration of the bandwidth assistant information of the terminal apparatus 208 may be transmitted from the base station apparatus 201 to the base station 202, and the transmission of the bandwidth assistant information may continue. In a case of transmitting information related to the configuration of the bandwidth assistant information from the base station apparatus 201 to the base station apparatus 202, the information may be passed through the mobility management entity 203. In a case of configuring transmission of the bandwidth assistant information by the base station apparatus 202 to which the handover is performed, the base station apparatus 202 may request, to the mobility management entity 203, subscriber bandwidth information for the terminal apparatus 208 or other terminal apparatuses connected to the base station apparatus 202.

Each apparatus operates as described above and thus transmission of the bandwidth assistant information is configured, and thus the terminal apparatus 208 uses information indicating the available bandwidth expected based on the contract information of the terminal apparatus connected to the base station apparatus 201. Requesting transmission of a segment for the media server 210 by using information indicating the newly predicted available bandwidth according to a change in state of the base station apparatus 201 allows the appropriate information speed to be specified to request transmission of the segment for the media server. These allow the experience of the user using the terminal apparatus 208 to be improved. The terminal apparatus 208 transmits the bandwidth assistant information release request message in a case that the terminal apparatus 208 terminates streaming viewing, which enables the base station apparatus 208 to release the resources used for the bandwidth assistant information transmission and transmission of subsequent segments, and enables effective utilization of the resources of the base station apparatus 208. In addition, the bandwidth assistant information can be used in a case that the connection destination of the terminal apparatus is changed, and the user experience can be improved. In the present embodiment, the communication controller 502 in FIG. 5 performs control of the messages transmitted and/or received by the base station apparatus 201.

Third Embodiment

The terminal apparatus may be connected to each of the multiple base station apparatuses through each physical link channel, and may transmit and/or receive data to and from each base station apparatus. This is referred to as a dual connectivity (a case that the terminal apparatus is connected to two base station apparatuses) or a multi connectivity (a case that the terminal apparatus is connected to two or more base station apparatuses). Hereinafter, an embodiment in which an aspect of the present invention is applied in a case that a terminal apparatus is dual-connected with two base station apparatuses will be described as a third embodiment.

Figure 7:
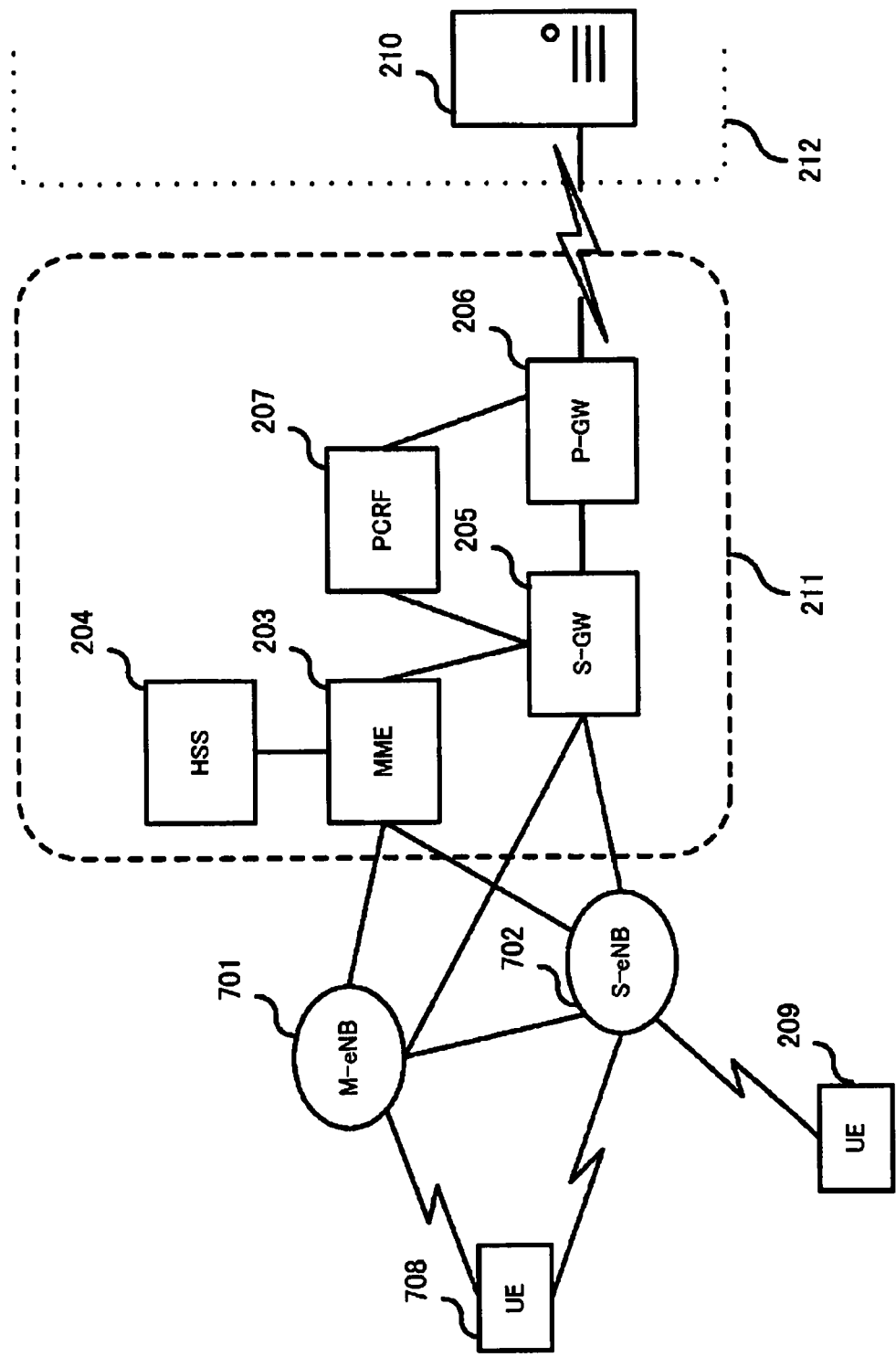
FIG. 7 is a diagram illustrating an example of a wireless communication system applied in an embodiment of the present invention.

FIG. 7 illustrates an example in which a terminal apparatus 708 is dual-connected with a base station apparatus 701 and a base station apparatus 702, and the base station apparatus 701 and the base station apparatus 702 are connected with the terminal apparatus 708 as a master base station apparatus and as a secondary base station apparatus through each physical link channel, respectively, and transmit and/or receive user data. Note that the physical link channels between the terminal apparatus 708 and the master base station apparatus 701 and the secondary base station apparatus 702 may be based on the same type of Radio Access Technology (RAT), or a different RAT. The master base station apparatus 701 and the secondary base station apparatus 702 are also connected to each other through base station interfaces, and information on each of the base station apparatuses, requests, responses, and the like are communicated to each other. The master base station apparatus 701 transmits and/or receives control information related to the connection with the terminal apparatus 708, and the master base station apparatus 701 indicates the secondary base station apparatus 702 to transmit and/or receive user data, and the secondary base station apparatus 702 transmits and/or receives user data to or from the terminal apparatus 708. The connection and communication procedures with the same reference signs as in FIG. 2 are the same as those of the first embodiment. The configuration of the master base station apparatus 701 and the secondary base station apparatus 702 is the same as that of FIG. 5, and the configuration of the terminal apparatus 708 is the same as that of FIG. 6, so the descriptions thereof will be omitted.

Figure 8:
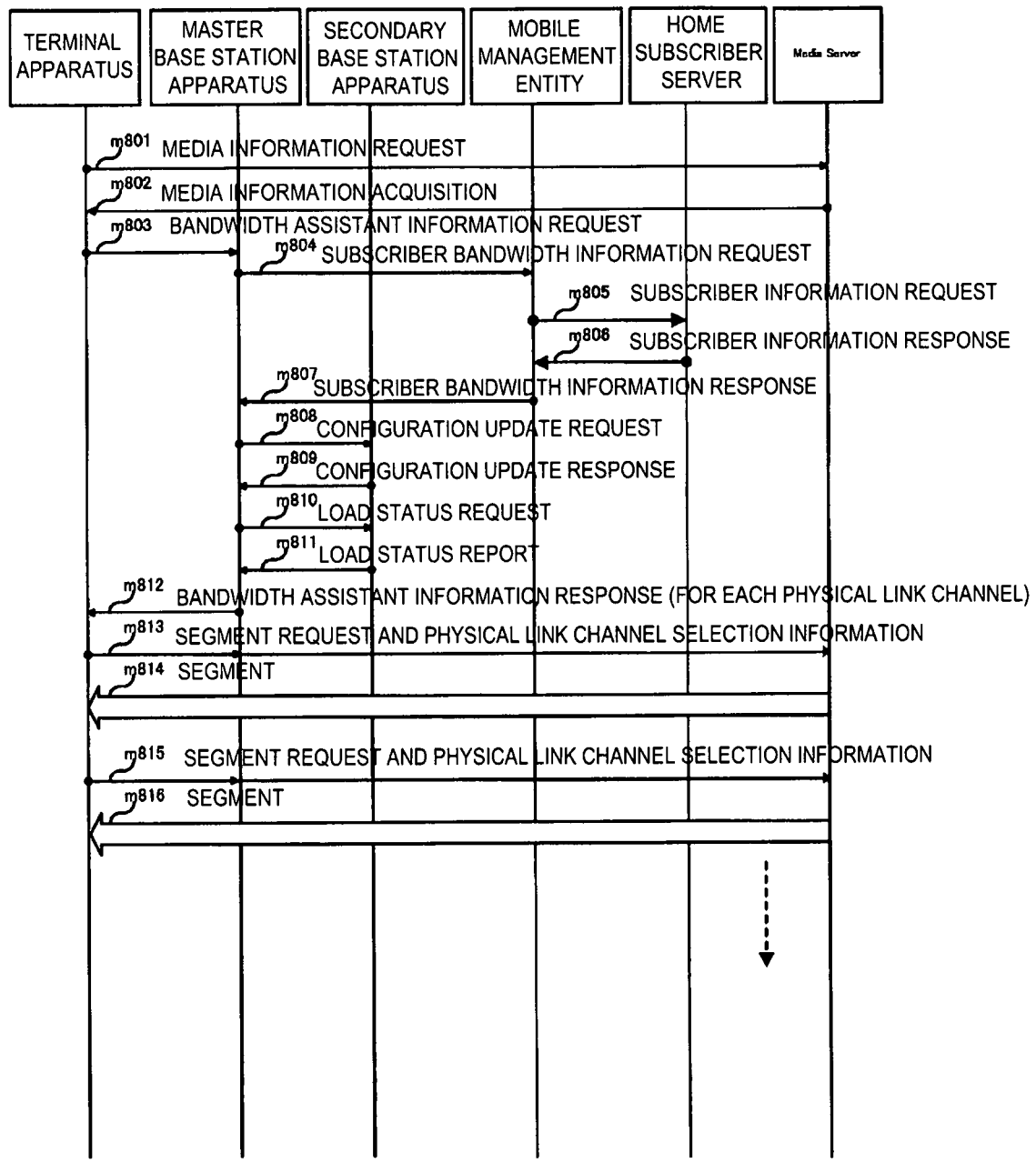
FIG. 8 is a diagram illustrating an example of message exchange used in an embodiment of the present invention.

FIG. 8 illustrates an example of a message flow according to the present embodiment. The terminal apparatus 708 transmits a message m801 to the media server 210 via the master base station apparatus 701 to request media information of the contents for the media server. Here, the media information is information related parameters for managing video content, and may include a resolution of the video content, an information speed (also referred to as a coding speed), and the like. The media information request m801 is a message of the terminal apparatus 708 requesting media information from the media server 210. The media server 210 transmits a message m802 to the terminal apparatus 708 via the core network 211 and the master base station apparatus 701, and transmits the requested media information to the terminal apparatus 708. The terminal apparatus 708 that has received the media information examines candidates for information speed (also referred to as bit rate) that can be used in requesting transmission of a segment for the media server, from the information included in the media information, and uses some or all of the candidates to transmit a message m803 to the master base station apparatus 701 to request bandwidth assistant information. This message transmission operation may be initiated by a media viewing application operating in the application controller 603 illustrated in FIG. 6 controlling the wireless controller 602 by using OS API operating in the application controller 603, or may be initiated by the OS operating in the application controller 603 monitoring the operation of the media viewing application and automatically operating the wireless controller 602 in a case of having detected that the media viewing application has received media information such as the message m802. The following message exchange is performed by the wireless controller 602, but the OS or the application operating in the application controller 603 may perform part of the message exchange processing. Here, the terminal apparatus 708 includes information related to information speed in the message m803. This information related to information speed may use candidates for information speed included in the media information received from the master base station apparatus 701, or the terminal apparatus 708 may select and use some information speeds among the candidates for information speed included in the media information. For example, the terminal apparatus 708 may exclude high-speed information speed at which the terminal apparatus 708 is not able to process, or exclude low-speed information speed at which the user experience is diminished, or may select in consideration of image processing performance, display screen size, and the like that the terminal apparatus 708 has, from the candidates for information speed included in the media information. The terminal apparatus 708 may configure information speed selection criteria beforehand, or may configure them at each time to transmit a bandwidth assistant information request such as the message m803. The master base station apparatus 701 that has received the message m803 transmits a message m804 to the mobility management entity 203, and requests information related to the bandwidth that the terminal apparatus is subscribed (hereinafter referred to as subscriber bandwidth information). In a case of transmitting the message m804, the master base station apparatus 701 may request the mobility management entity 203 for subscriber bandwidth information of multiple terminal apparatuses. As one example, in addition to the terminal apparatus 708 that has transmitted the message m803, subscriber bandwidth information for terminal apparatuses that are currently connected to the master base station apparatus 701 and the secondary base station apparatus 702 may be requested. At this time, the master base station apparatus 701 may examine the capability of the terminal apparatuses connected to the master base station apparatus 701 and the secondary base station apparatus 702, and may request subscriber bandwidth information by excluding terminal apparatuses that cannot communicate at an information speed equal to or greater than a prescribed value. In a case that the capability of the terminal apparatus 708 is not capable of communicating at an information speed equal to or greater than a prescribed value, the prescribed value may be used as subscriber bandwidth information for the terminal apparatus 708, and may be used to generate the bandwidth assistant information described later, without performing subscriber bandwidth information request to the mobility management entity 203. In a case that there is information of the terminal apparatus acquired from the mobility management entity 203 within a prescribed time, the request for information regarding the terminal apparatus may be stopped.

The mobility management entity 203 having received the message m804 transmits a message m805 to the home subscriber server 204 to request subscriber information for the terminal apparatus specified in the message m804. At this time, it is not necessary to request all of the subscriber information of the terminal apparatus, and only information related to the prediction of the bandwidth may be requested. For example, some or all of call control information (barring information) of the terminal apparatus, access restriction information, charge contract information, contracted Quality of Service (QoS) profile information, total bandwidth information of contracted bearers, charge information contracted for a packet data network, and the like, may be requested. Information related to different bandwidth may be requested for each terminal. In a case that information obtained by querying the home subscriber server 204 within a predetermined amount of time is present in the mobility management entity 203, information may not be queried for the terminal apparatus corresponding to that information.

The home subscriber server 204 that has received the message m805 transmits, to the mobility management entity 203, a message m806 as a response to the message m805, including information related to the terminal apparatus requested with the subscriber information included in the message m805. The home subscriber server 204 may include all the information requested in the message m806 or may transmit only a part of the requested information. As an example, information with no contract may be notified of the absence of a contract, or the presence or absence of information may not be notified. The message m806 may not include information determined to be problematic for notifying in view of security management of the network.

The mobility management entity 203 having received the message m806 utilizes the information included in the message m806 to generate a response message m807 for the request for subscriber bandwidth information for the message m804, and transmits the generated message to the base station apparatus 201 which has transmitted the message m804. The message m807 may include all of the contents requested in the message m804, or in a case that the information not requested by the message m805 is present in the mobility management entity 203, may include the information not requested. In addition, the message m807 may not include all the information requested in the message m804, and may not include information that is not included in the message m806 transmitted from the home subscriber server 204, or information determined to be problematic for notifying in view of security management of the network. For example, the subscriber information response in the message m807 includes subscriber bandwidth information for the terminal apparatus 208, and includes information on the bandwidth used by the terminal apparatus 208.

On the other hand, the master base station apparatus 701 transmits a message m808 to the secondary base station apparatus 702, and makes a configuration update request. The configuration update request includes changing to a configuration where the load status information of the secondary base station apparatus 702 is transmitted to the master base station apparatus 701. The transmission of the load status information from the secondary base station apparatus 702 may be configured to be periodical transmission to the master base station apparatus 701 or may be configured to be aperiodical (on-demand) transmission in response to a request from the master base station apparatus 701, or may be configured to allow both types of transmission. Examples of the contents of the load status information to be reported include a congestion status and an available amount of wireless resources managed by the secondary base station apparatus 702, the number of terminal apparatuses being connected, the hardware load status, and the like. Note that, without being limited to these, some or all of the information managed and understood by the secondary base station apparatus 702 may be included. The secondary base station apparatus 702 that has received the message m808 updates the configuration in accordance with the configuration update contents included in the message m808, and transmits a message m809 to the master base station apparatus 701 as a configuration update response for the message m808. The master base station apparatus 701 having received the message m809 transmits a message m810 to the secondary base station apparatus 702, and makes a load status request. The secondary base station apparatus 702 having received the message m810 includes the load status information in a message m811 in accordance with the load status report configuration configured in the message m808, and transmits the load status information to the master base station apparatus 701. Note that in a case that the load status report configuration is configured periodically, the secondary base station apparatus 702 periodically transmits the message m811 to the master base station apparatus 701 even in a case that the message m810 is not transmitted from the master base station apparatus 701.

The master base station apparatus 701 that has received the message m807 and the message m811 predicts bandwidth available by the terminal apparatus 708, based on information related to information speed included in the message m803, the subscriber bandwidth information included in the message m807, and the load status information included in the message 811, generates a message m812 including the bandwidth information, and transmits the message m812 which is bandwidth assistant information to the terminal apparatus 708 as a response to the message m803. The bandwidth assistant information is information on candidates of information speed that can be specified or a range of information speeds that can be specified in a case that the terminal apparatus 708 thereafter requests transmission of segments for the media server 210, and is calculated for each physical link channel on which the terminal apparatus 708 is connected to the master base station apparatus 701 and the secondary base station apparatus 702. The master base station apparatus 701 selects information to be included in the bandwidth assistant information from candidates of information speed included in the message m803. For example, in a case that the information speeds included in the media information are 800 Kbps, 1 Mbps, and 2 Mbps and the communication speed of the terminal apparatus 208 indicated by the subscriber bandwidth information of the terminal apparatus 708 is at most 1 Mbps, the master base station apparatus 701 may configure the information speed included in the bandwidth assistant information to be any of 800 Kbps and 1 Mbps, or 1 Mbps only. In a case that information other than the subscriber bandwidth information of the terminal apparatus 708 is to be taken into account, for example, in case that there are many terminal apparatus connected to the master base station apparatus 701 and the secondary base station apparatus 702, only 800 kbps that is less than or equal to the value indicated by the subscriber bandwidth information may be configured. In calculating the information speed included in the bandwidth assistant information, the master base station apparatus 701 may measure the average communication speed of the other terminal apparatuses connected to the master base station apparatus 701 or the secondary base station apparatus 702, and determine the available bandwidth, based on the speed subtracting the average communication speed from the communication speed in a case of utilizing the total bandwidth available by the master base station apparatus 701 or the secondary base station apparatus 702. In a case that the master base station apparatus 701 or the secondary base station apparatus 702 manages the transmission signal in wireless resource units divided in the frequency direction and the time direction, the available bandwidth may be determined based on the number of wireless resources that are unused for transmission for each terminal apparatus. In a case that a contract to guarantee communication bandwidth is included in the contract information of the terminal apparatus 708 that has transmitted the message m803, the available bandwidth may be determined based on the compensated communication bandwidth. In a case that a contract to guarantee communication bandwidth is included in the contract information of other terminal apparatuses connected to the master base station apparatus 701 or the secondary base station apparatus 702, the available bandwidth may be determined while separately guaranteeing the guaranteed bandwidth. In a case that a contract to guarantee latency is included in the contract information of the other terminal apparatuses connected to the master base station apparatus 701 or the secondary base station apparatus 702, the available bandwidth may be determined while guaranteeing the bandwidth necessary for the latency guarantee. This latency guarantee may guarantee latency in which communication can be reliably performed, or may guarantee the time to reach of the initial feed even in a case that the arrival is uncertain. In a case that a terminal apparatus not including a communication bandwidth guarantee contract is included in other terminal apparatuses connected to the master base station apparatus 701 or the secondary base station apparatus 702, the available bandwidth may be determined assuming that the terminal apparatus turns down the currently used communication bandwidth. In addition to the information included in the message m807 and the message m811, the available bandwidth may be determined using other information in the master base station apparatus 701 and the secondary base station apparatus 702. There may be one or multiple information speeds included in the message m812 as the available bandwidth. In a case that the message m812 includes multiple information speeds, information related to the upper and lower limits of the available bandwidth may be included. Furthermore, the master base station apparatus 701 may calculate the prediction of the charge amount, based on the charge contract configuration configured for each physical link channel on which the terminal apparatus 708 is connected to the master base station apparatus 701 and the secondary base station apparatus 702. Note that in calculating the bandwidth assistant information for each physical link channel, the master base station apparatus 701 may perform calculation for each of the all physical link channels, or may calculate for each base station apparatus.

The terminal apparatus 708 that has received the message m812 performs the selection of the information speed and physical link channel of a segment to be received next by using the bandwidth assistant information for each physical link channel transmitted in the message m812 (information speed notified as the available bandwidth). A message m813 and a message m815 that request the transmission of a segment for the media server 210 are transmitted via the master base station apparatus 701. Note that, at this time, the terminal apparatus 708 adds, to the message m813 and the message m815, physical link channel selection information indicating whether the segment is received using one or both of the physical link channels on which the master base station apparatus 701 and the secondary base station apparatus 702 are connected. In a case that multiple information speeds are included in the message m812, the terminal apparatus 708 may transmit the message m813 and the message m815, using any of the multiple information speeds. For example, the message m813 and the message m815 may be transmitted by specifying a small information speed in a case that an amount of information accumulated in a receiving buffer of the terminal apparatus 708 is large, or by specifying a large information speed in a case that information accumulated in the receiving buffer is small. Furthermore, in a case that the upper limit and the lower limit of the bandwidth available are specified in the message m812, the information speed may be specified in the range of the upper limit and the lower limit. In a case that the charge amount prediction information is associated with each physical link channel in the message m812, which physical link channel to be used may be specified in accordance with the charge policy of the terminal apparatus 708.

The master base station apparatus 701 configures the master base station apparatus 701 and the secondary base station apparatus 702 so as to use the physical link channel selected with the physical link channel selection information added to the message m813 and the message m815 received from the terminal apparatus 708. Then, the segments sent from the media server 210 according to the information speed included in the message m813 and the message m815 are transmitted to the terminal apparatus 708 on the physical link channel selected in the physical link channel selection information.

Note that in the present embodiment, a description has been made in which an aspect of the present invention is applied to a dual connectivity connecting the terminal apparatus and two base station apparatuses, but the present invention is not limited thereto, and a similar procedure can be applied to a multi connectivity connecting a terminal apparatus to three or more base station apparatuses.

Each apparatus operates as described above, and thus the terminal apparatus 708 can use information indicating the available bandwidth for each physical link channel expected based on the contract information of the terminal apparatus connected to the master base station apparatus 701 and the secondary base station apparatus 702, and request transmission of a segment for the media server 210 via the master base station apparatus 701. This allows the terminal apparatus 708 to specify an appropriate physical link channel and information speed to request transmission of the segment, thus improving the experience of the user using the terminal apparatus 708. In the present embodiment, the communication controller 502 in FIG. 5 performs control of the messages transmitted and/or received by the master base station apparatus 701 and the secondary base station apparatus 702.

Fourth Embodiment

In the third embodiment, the procedure in which the terminal apparatus 708 adds physical link channel selection information to a segment request and transmits the physical link channel selection information and the physical link channel selection information to the master base station apparatus 701, but the physical link channel selection information and the segment request may be transmitted separately. This will be described as a fourth embodiment.

Figure 9:
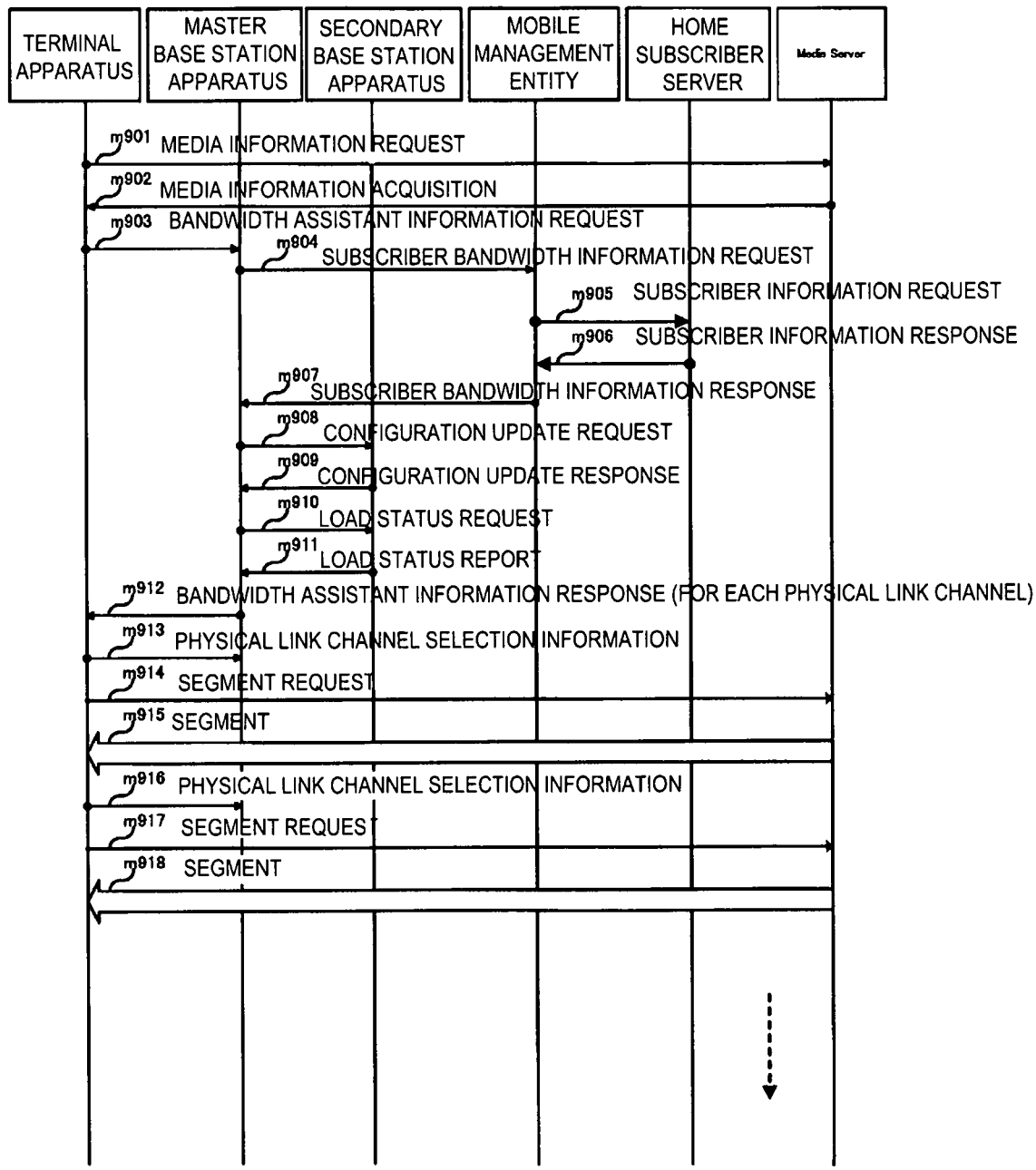
FIG. 9 is a diagram illustrating an example of message exchange used in an embodiment of the present invention.

FIG. 9 illustrates an example of a message flow according to the present embodiment. In FIG. 9, the procedure from a message m901 to a message m912 is identical to the procedure from the message m801 to the message m812 of FIG. 8, and thus the descriptions thereof will be omitted.

The terminal apparatus 708 that has received the message m912 performs the selection of the information speed and physical link channel of a segment to be received next by using the bandwidth assistant information for each physical link channel transmitted in the message m912 (information speed notified as the available bandwidth). Then, the physical link channel selection information indicating the selected physical link channel is transmitted to the master base station apparatus 701 as a message m913 and a message m916, and a segment request including information of a used bandwidth is transmitted to the media server 210 as a message m914 and a message m917. In a case that multiple information speeds are included in the message m912, the terminal apparatus 708 may transmit the message m914 and the message m917 using any of the multiple information speeds. For example, the message m914 and the message m917 may be transmitted by specifying a small information speed in a case that an amount of information accumulated in a receiving buffer of the terminal apparatus 708 is large, or by specifying a large information speed in a case that information accumulated in the receiving buffer is small. Furthermore, in a case that the upper limit and the lower limit of the bandwidth available are specified in the message m912, the information speed may be specified in the range of the upper limit and the lower limit. In a case that the charge amount prediction information is associated with each physical link channel in the message m912, which physical link channel to be used may be specified in accordance with the charge policy of the terminal apparatus 708.

The master base station apparatus 701 configures the master base station apparatus 701 and the secondary base station apparatus 702 so as to use the physical link channel selected with the physical link channel selection information of the message m913 and the message m916 received from the terminal apparatus 708. Then, the segments sent from the media server 210 according to the information speed included in the message m914 and the message m917 are transmitted to the terminal apparatus 708 on the physical link channel selected in the physical link channel selection information.

Note that in the present embodiment, a description has been provided in which an aspect of the present invention is applied to a dual connectivity connecting the terminal apparatus and two base station apparatuses, but the present invention is not limited thereto, and a similar procedure can be applied to a multi connectivity connecting a terminal apparatus to three or more base station apparatuses.

Each apparatus operates as described above, and thus the terminal apparatus 708 can use information indicating the available band for each physical link channel expected based on the contract information of the terminal apparatus connected to the master base station apparatus 701 and the secondary base station apparatus 702, and can request transmission of a segment for the media server 210 in a configuration desired by the terminal apparatus 708, and the experience of the user using the terminal apparatus 708 can be improved.

Note that a wireless communication system that applies one aspect of the present invention is not limited to that of FIG. 2 and FIG. 7. The core network 211 in FIG. 2 and FIG. 7 is an example of the configuration of an Evolved Packet Core (EPC), which is a core network in a Long Term Evolution (LTE) system, but another core network, such as a core network referred to as NextGen may be used without limitation of the configuration to the core network 211. The number of base station apparatuses and terminal apparatuses is not limited to that of FIG. 2 and FIG. 7, and multiple terminal apparatuses may be connected to one base station apparatus. A terminal apparatus may be configured to connect with the Internet via an access point other than a base station apparatus to which multiple terminal apparatuses are connected, and the access point may be configured to transmit bandwidth assistant information to the terminal apparatus.

The message exchange example used in one aspect of the present invention is a message exchange via the mobility management entity 203 or the home subscriber server 204, but is not limited to this configuration. For example, in a case that an aspect of the present invention is applied to a system in which the system configuration of the core network has been modified, message exchange may be performed where the mobility management entity 203 and home subscriber server 204 of the present invention may be replaced with an entity having a respective function in the modified system.

Note that, a program for enabling some or all of the functions of each apparatus described above may be recorded on a computer-readable recording medium to cause a computer system to read the program recorded on the recording medium for performing the processing of each of the units. The "computer system" here includes an OS and hardware components such as a peripheral device.

Further, the "computer system" includes environment for supplying a home page (or environment for display) in a case of utilizing a WWW system.

Furthermore, the "computer-readable recording medium" refers to a portable medium such as a flexible disk, a magneto-optical disk, a ROM, a CD-ROM, and the like, and a storage apparatus such as a hard disk built into the computer system. Moreover, the "computer-readable recording medium" may include a medium that dynamically retains the program for a short period of time, such as a communication line that is used to transmit the program over a network such as the Internet or over a communication circuit such as a telephone circuit, and a medium that retains, in that case, the program for a fixed period of time, such as a volatile memory within the computer system which functions as a server or a client. Furthermore, the program may be configured to realize some of the functions described above, and also may be configured to be capable of realizing the functions described above in combination with a program already recorded in the computer system.

Furthermore, all or some functions of each of the apparatuses described above may be realized by aggregating into an integrated circuit. Each functional block may be individually realized as chips, or may be partially or completely integrated into a chip. Furthermore, a circuit integration technique is not limited to the LSI, and may be realized with a dedicated circuit or a general-purpose processor. Furthermore, in a case that with advances in semiconductor technology, a circuit integration technology with which an LSI is replaced appears, it is also possible to use an integrated circuit based on the technology.

The embodiments of the present invention have been described in detail above referring to the drawings, but the specific configuration is not limited to the embodiments and includes, for example, an amendment to a design that falls within the scope that does not depart from the gist of the present invention.

INDUSTRIAL APPLICABILITY

An aspect of the present invention is preferable for use in a wireless communication system and a communication apparatus. An aspect of the present invention can be utilized, for example, in a communication system, communication equipment (for example, a cellular phone apparatus, a base station apparatus, a wireless LAN apparatus, or a sensor device), an integrated circuit (for example, a communication chip), or a program.

REFERENCE SIGNS LIST 201, 202 Base station apparatus
203 Mobility management entity
204 Home subscriber server
205 Serving gateway
206 PDN gateway
207 Policy and charging rules management function
208, 209 Terminal apparatus
210 Media server
211 Core network
212 Internet
501 Wireless interface unit
502 Communication controller
503 X2 interface unit
504 S1-MME interface unit
505 S1-U interface unit
506 Region indicating blocks included in base station apparatus
601 Wireless interface unit
602 Wireless controller
603 Application controller
604 Operation unit
605 Display unit
701 Master base station apparatus
702 Secondary base station apparatus
708 Terminal apparatus

The invention claimed is:

1. A base station apparatus in a wireless network system at least including a terminal apparatus and multiple base station apparatuses, the base station apparatus comprising:
a wireless interface unit configured to communicate, by using radio signals, with the terminal apparatus connected to each of the multiple base station apparatuses via at least one physical link channel; and
a communication controller configured to
receive a bandwidth assistant information request from the terminal apparatus via the wireless interface unit, and
transmit, to the terminal apparatus, bandwidth assistant information for the at least one physical link channel to which the terminal apparatus is connected,
wherein the bandwidth assistant information includes charge information for the at least one physical link channel, and
the charge information is calculated by the base station apparatus based on charge contract information received from a core network.

2. The base station apparatus according to claim 1, wherein:
the bandwidth assistant information further includes at least one of an upper limit of a bandwidth, a lower limit of the bandwidth, an average of the bandwidth and a latency; and
the bandwidth is available for the base station apparatus to transmit a segment.

3. The base station apparatus according to claim 1, wherein in a case that a state of the base station apparatus is changed, the bandwidth assistant information is again transmitted to the terminal apparatus.

4. The base station apparatus according to claim 1, wherein the bandwidth assistant information is periodically transmitted to the terminal apparatus in accordance with a bandwidth assistant setup request received from the terminal apparatus.

5. The base station apparatus according to claim 1, wherein a segment is transmitted to the terminal apparatus by using the at least one physical link channel selected in accordance with selection information of the at least one physical link channel added to a segment request received from the terminal apparatus.

6. A terminal apparatus in a wireless network system including at least the terminal apparatus and multiple base station apparatuses, the terminal apparatus comprising:
a wireless interface unit configured to connect to the multiple base station apparatuses via at least one physical link channel and perform wireless communication; and
a wireless controller configured to control the wireless communication by generating control data for controlling a wireless network and receiving control data from the wireless interface unit, wherein:
the wireless controller receives bandwidth assistant information for the at least one physical link channel by controlling the wireless interface unit;
the wireless controller transmits a segment request including selection information of the at least one physical link channel and speed selection information;
the bandwidth assistant information includes charge information for the at least one physical link channel; and
the charge information is calculated by each of the multiple base station apparatuses based on charge contract information received from a core network.

7. A wireless communication system comprising at least multiple base station apparatuses and a terminal apparatus, wherein:
the multiple base station apparatuses each connects to the terminal apparatus via at least one physical link channel;
the multiple base station apparatuses each receives a bandwidth assistant information request from the terminal apparatus;
the multiple base station apparatuses each transmits, to the terminal apparatus, bandwidth assistant information for the at least one physical link channel to which the terminal apparatus is connected;

the terminal apparatus transmits, to each of the multiple base station apparatuses, a segment request including selection information of the at least one physical link channel and selection information of a used bandwidth;

the bandwidth assistant information includes charge information for the at least one physical link channel; and the charge information is calculated by each of the multiple base station apparatuses based on charge contract information received from a core network.

8. The wireless communication system according to claim 7, wherein the bandwidth assistant information further includes the charge information for the at least one physical link channel, based on contract information for the at least one physical link channel.

9. The wireless communication system according to claim 7, wherein:

the bandwidth assistant information further includes at least one of an upper limit of a bandwidth, a lower limit of the bandwidth, an average of the bandwidth and a latency; and the bandwidth is available for the base station apparatus to transmit a segment.

10. The wireless communication system according to claim 7, wherein in a case that states of the multiple base station apparatuses are changed, the multiple base station apparatuses each again transmits, to the terminal apparatus, the bandwidth assistant information for the at least one physical link channel.

11. The wireless communication system according to claim 7, wherein the multiple base station apparatuses each periodically transmits the bandwidth assistant information to the terminal apparatus in accordance with a bandwidth assistant setup request received from the terminal apparatus.

12. The wireless communication system according to claim 7, wherein the multiple base station apparatuses each transmits a segment to the terminal apparatus by using the at least one physical link channel selected in accordance with the selection information of the at least one physical link channel added to a segment request received from the terminal apparatus.

* * * * *